Aug. 22, 1967     L. H. COOK ET AL     3,337,297
PROCESS FOR COMBINED PRODUCTION OF AMMONIA AND AMMONIUM SALTS
Filed Feb. 8, 1965
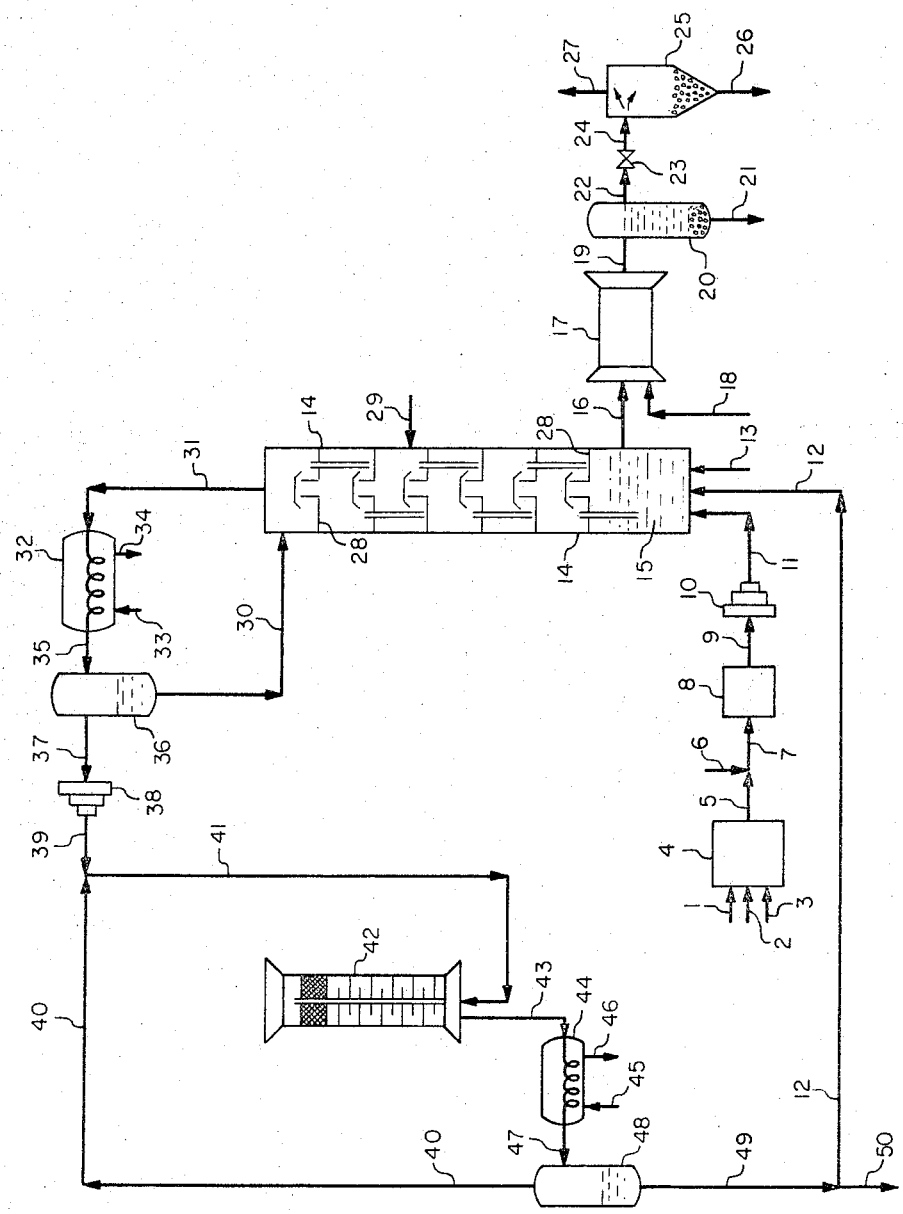
LUCIEN H. COOK
IVO MAVROVIC
INVENTORS.
BY *J. T. Chabrty*
AGENT United States Patent Office 3,337,297
Patented Aug. 22, 1967

3,337,297
PROCESS FOR COMBINED PRODUCTION OF
AMMONIA AND AMMONIUM SALTS
Lucien H. Cook, Port Washington, and Ivo Mavrovic, New York, N.Y., assignors to Chemical Construction Corporation, New York, N.Y., a corporation of Delaware
Filed Feb. 8, 1965, Ser. No. 430,986
10 Claims. (Cl. 23—103)

ABSTRACT OF THE DISCLOSURE

Carbon dioxide is completely removed from crude ammonia synthesis gas by compressing the crude gas and contacting the compressed crude synthesis gas with ammonia and water at elevated pressure, so as to dissolve most of the carbon dioxide into the liquid phase as ammonium carbonate. The residual liquid phase of depleted carbon dioxide content is cooled and refluxed at elevated pressure with water and then with liquid ammonia, so as to completely remove all of the carbon dioxide from the gas phase and produce a purified synthesis gas suitable for direct passage to the ammonia synthesis loop. The resultant liquid phase consisting of high pressure ammonium carbonate solution is reacted at elevated pressure with a compound containing a soluble anion such as an acid, to produce an ammonium salt in solution. The high pressure solution is expanded to reduced pressure to evolve water vapor and produce a solid ammonium salt product.

This invention relates to the combined production of ammonia and ammonium slats from synthesis gas and an anion-donating compound such as an acid. A process is provided in which carbon dioxide is completely removed from crude synthesis gas as aqueous ammonium carbonate solution by reaction of the synthesis gas with synthesized liquid ammonia at elevated pressure and in the presence of water. The aqueous ammonium carbonate solution is then preferably reacted at elevated pressure with an anion donating compound such as a mineral acid, to yield the ammonium salt of the acid, in eqeuous solution. A solid ammonium salt is ultimately produced by pressure reduction, which results in concomitant evolution of water vapor and carbon dioxide. The residual synthesis gas phase, now free of carbon dioxide, is separated from the aqueous ammonium carbonate solution and directly passed to ammonia synthesis. A combined processing sequence is thus provided, which eliminates major processing steps and costs of the prior art.

Ammonia is synthetically produced by the catalytic combination of hydrogen and nitrogen at elevated pressure and temperature. The hydrogen is generally produced from hydrocarbons, by such well-known procedures as catalytic steam reforming or partial oxidation. A typical steam reforming process for the production of ammonia synthesis gas is described in U.S. Patent No. 2,829,113, and a partial oxidation procedure is described in U.S. Patent No. 3,022,148. In these procedures, a crude synthesis gas is produced which principally contains hydrogen, nitrogen, carbon monoxide and steam. The carbon monoxide is catalytically converted to carbon dioxide by reaction with steam, with concomitant production of further hydrogen, as described in U.S. Patents 2,829,113 and 3,010,807. Thus a synthesis gas is produced which contains hydrogen and nitrogen in the required proportions for ammonia synthesis, together with carbon dioxide.

Carbon dioxide has generally been removed from the synthesis gas by scrubbing the gas stream with an absorbent containing an alkaline reagent, such as potassium carbonate or monoethanolamine. A procedure of this nature is described in U.S. Patent No. 2,886,405. The absorbent solution containing dissolved carbon dioxide is regenerated by heating, generally at reduced pressure. Carbon dioxide is thus driven off as a separate gas stream. The resulting synthesis gas stream now containing principally hydrogen and nitrogen together with minor amounts of carbon monoxide, argon and methane, is passed to catalytic methanation or scrubbing with ammoniacal cuprous chloride solution to remove residual carbon monoxide. The final synthesis gas stream is now compressed and passed to high pressure catalytic ammonia synthesis, such as described in U.S. Patent No. 2,853,371. The resulting effluent gas from catalytic synthesis is cooled to condense synthesized liquid ammonia, which is separated from the residual synthesis gas stream. This gas stream is then recycled for further ammonia synthesis.

In the present invention, at least a portion of the synthesized liquid ammonia is reacted at elevated pressure with the crude synthesis gas containing carbon dioxide. This reaction is carried out at elevated pressure and relatively low temperature and in the presence of excess water, so as to prevent the formation of urea. The carbon dioxide under these conditions is completely converted to ammonium carbonate in aqueous solution, except in cases where a relatively smaller excess of water is provided. In this case some of the carbon dioxide may be combined in the form of ammonium carbamate, which is a dehydration product of ammonium carbonate. In the process description and claims infra, it will be understood that reference to ammonium carbonate will include the carbamate form of the compound as well as the carbonate, thus reference to an aqueous solution of ammonium carbonate includes and encompasses as well a mixed solution of ammonium carbonate and ammonium carbamate.

The ammonium carbonate solution is separated from the residual gas phase, which now consists of synthesis gas free of carbon dioxide, plus ammonia vapor. This purified synthesis gas is passed to an ammonia synthesis system of conventional design, after at least partial removal of ammonia vapor by cooling and condensation. The resulting liquid ammonia is recycled for further carbon dioxide removal. The ammonium carbonate solution may be a product of the process, however the ammonium carbonate solution in a preferred embodiment of the present invention is reacted at elevated pressure with an anion-donating compound such as a mineral acid, so as to produce a desired ammonium salt or compound. Within the scope and context of the present invention, an anion-donating compound designates a compound which donates a negative ion or radical to form the corresponding ammonium salt. In most cases, an anion will consist of a negative radical, such as the sulfate, nitrate or phosphate radical. The resultant solution of the desired ammonium salt is then passed to lower pressure in a flash evaporation stage, so as to produce a solid ammonium salt directly or a slurry of the ammonium salt. Due to the formation of the ammonium salt at elevated pressure and subsequent pressure reduction, water vapor is evolved and the solid salt is deposited. When an acid is reacted with the ammonium carbonate, carbon dioxide is also evolved on pressure reduction.

The presence sequence of the present invention provides several outstanding advantages. The capital investment cost and plant utilities requirement of the ammonia synthesis facility are substantially reduced, since the prior art process step involving the scrubbing of the crude synthesis gas with alkaline absorbent reagent for carbon dioxide removal, followed by separate regeneration of the reagent, is completely eliminated. In addition, the process of the present invention provides a valuable sequence for the production of useful ammonium salts, such as ammonium sulfate, ammonium nitrate and diammonium phosphate. The concept of high pressure reaction of the ammonium carbonate in solution with an anion-donating compound, followed by subsequent pressure reduction with concomitant evolution of water vapor, provides a valuable technique for the direct production of solid ammonium salts.

It is an object of the present invention to produce ammonia and ammonium salts in a combined process.

Another object is to provide an improved sequence for removal of carbon dioxide from crude synthesis gas.

A further object is to reduce the capital investment and operating utilities cost for the production of ammonia and ammonium salts.

An additional object is to directly produce solid ammonium salts in a more efficient manner.

Still another object is to produce a valuable ammonium salt by reaction of ammonium carbonate in solution with an anion-donating compound at elevated pressure.

These and other objects and advantages of the present invention will become evident from the description which follows. Referring to the figure, a hydrocarbon stream 1 is reacted with steam stream 2 and air stream 3 in unit 4 to produce a crude synthesis gas stream 5. Stream 1 may consist of a gaseous or liquid hydrocarbon, or in some cases even a solid carbonaceous material such as coal or coke may be employed as stream 1. The reaction in unit 4 may consist either of catalytic steam reforming or non-catalytic partial oxidation, and in the case of partial oxidation stream 3 will be enriched with added oxygen. The reaction in unit 4 is preferably carried out at an elevated pressure, typically in the range of 50 p.s.i.g. to 600 p.s.i.g. The resulting gas stream 5 is then usually combined with excess added via stream 6, to form stream 7 which is passed to catalytic CO-oxidation in unit 8, whereby carbon monoxide is catalytically reacted with steam to produce further hydrogen and carbon dioxide. The resulting final crude synthesis gas stream 9, principally containing hydrogen, nitrogen and carbon dioxide, is now compressed in compressor 10 to an elevated pressure, typically in the range of 1000 p.s.i.g. to 5000 p.s.i.g., to produce compressed crude synthesis gas stream 11.

The compressed gas stream 11 is now combined with synthesized liquid ammonia stream 12 at elevated pressure and in the presence of water, which is preferably introduced via stream 13. As will appear infra, in some cases stream 13 may be omitted, since reflux water is added at a later stage of the process. The combination of streams 11, 12 and 13 takes place in elevated pressure vessel 14, in which both formation of aqueous ammonium carbonate solution and complete removal of carbon dioxide from the gas phase take place. Most of the carbon dioxide contained in stream 11 is combined with ammonia from stream 12 in the presence of water within liquid pool 15, to form aqueous ammonium carbonate solution in the lower liquid retention section of unit 14, which is maintained at an elevated pressure typically in the range of 1000 p.s.i.g. to 5000 p.s.i.g. and a temperature preferably in the range of 50° C. to 130° C. Lower temperature may be attained by the provision of cooling coils, not shown, in order to prevent the formation of urea. In addition, the formation of urea is prevented by the provision of excess water in pool 15. A liquid stream 16 consisting of aqueous ammonium carbonate solution, and which may also contain a slight excess of free ammonia, is withdrawn from vessel 14, and is processed to produce a product solid ammonium salt.

Stream 16 itself may be a product of the process, and in some cases may be directly utilized as such for useful purposes. However, stream 16 is preferably further reacted to produce a useful ammonium salt. Thus, stream 16 is passed at elevated pressure into reaction vessel 17, together with stream 18, which consists of an anion-donating compound such as an acid. Stream 18 preferably consists of a mineral acid such as sulfuric acid, nitric acid, or phosphoric acid, in which case the reaction in vessel 17 produces the ammonium salt of the acid together with carbonic acid in solution. In a variation of this sequence, stream 18 will consist of solid finely ground calcium sulfate, in which case the reaction in vessel 17 will produce ammonium sulfate in aqueous solution plus solid calcium carbonate. Other solid compounds besides calcium sulfate may be suitably employed as stream 18, in order to donate an anion and yield a valuable ammonium salt. In any case, an elevated pressure in the range of 1000 p.s.i.g. to 5000 p.s.i.g. is maintained in vessel 17, together with an elevated temperature typically in the range of 70° C. to 400° C. The ammonium carbonate in solution 16 is thus completely reacted with the compounds in stream 18 to produce a valuable ammonium salt in solution.

The resulting stream 19 is now removed from vessel 17, and is processed to recover solid ammonium salt. In cases such as where stream 18 consists of calcium sulfate, stream 19 will contain a solid by-product compound such as calcium carbonate. In this case, stream 19 is passed to solids-liquid separator 20, from which the solids compound is removed as a settled slurry 21. The supernatant liquid phase above the settled slurry and containing dissolved ammonium salt is removed from unit 20 via stream 22. In cases where stream 19 is free of solids, the processing of unit 20 will be omitted and stream 19 will be passed directly to stream 22.

Stream 22, which is at elevated temperature and pressure, is now subjected to pressure reduction and concomitant flash evaporation of water vapor. In cases where stream 18 consists of an acid, the pressure reduction will also result in the evolution of carbon dioxide. Thus, stream 22 is passed through pressure reducing valve 23, and is discharged as stream 24, which is preferably at a reduced pressure in the range of 5 p.s.i.g. to 100 p.s.i.g. Stream 24 discharges into flash evaporation vessel 25, and due to the pressure reduction water is flash evaporated from the liquid stream, which results in the deposition of solid ammonium salt in the form of discrete solid particles or as a slurry. The solid ammonium salt is removed as a product via stream 26, and may be subjected to further drying, not shown. Water vapor is discharged from unit 25 via stream 27, and as indicated supra in some cases stream 27 will also contain carbon dioxide.

Returning now to vessel 14, residual gas phase mainly consisting of hydrogen, nitrogen, ammonia and residual carbon dioxide, now passes upwards from pool 15 and into the upper gas reflux section of unit 14, which is provided with a plurality of bubble cap trays 28 with downcomers. A cooling and reflux stream 29 consisting of cold water is admitted to an intermediate tray in unit 14. In addition, a temperature gradient is maintained in the upper reflux section by means of cold liquid ammonia, which is passed into unit 14 above the top tray via 30. The top tray temperature is generally maintained below 50° C. to provide complete transfer of carbon dioxide into the liquid phase, although somewhat higher operating temperatures are also feasible at relatively more elevated pressures. Due to the temperature gradient and reflux ammonia, all of the carbon dioxide in the residual gas phase is converted to aqueous ammonium carbonate solution and passed downwards through unit 14. A purified gaseous phase free of carbon dioxide and consisting of hydrogen, nitrogen and ammonia vapor is removed via stream 31 from the top of unit 14.

Stream 31 is passed to cooler 32, which is provided with cooling or refrigeration inlet 33 and exit 34. At least a portion of the ammonia content of gas stream 31 is thus condensed to liquid ammonia, by cooling of the gas stream preferably to a temperature below 40° C. The resulting cooled stream 35 is passed to gas-liquid separator 36, and the liquid ammonia component is withdrawn via 30 and recycled as cold liquid ammonia reflux.

The gaseous portion of stream 35 is withdrawn from unit 36 via stream 37, and is now usually compressed in compressor 38 to a more highly elevated ammonia synthesis pressure, typically in the range of 4000 p.s.i.g. to 6000 p.s.i.g. In some cases stream 37 will be at a sufficiently elevated pressure for direct usage in ammonia synthesis, and compressor 38 and its function may be omitted. In any case, the resulting gas stream 39 is combined with recirculating ammonia synthesis gas stream 40, which also mainly consists of nitrogen, hydrogen and ammonia vapor. The combined gas stream 41 may now be passed through a gas circulator, not shown, in order to provide a gas pressure head to make up for pressure drop through the ammonia synthesis loop. Stream 41 is now passed to catalytic ammonia converter 42. Ammonia is synthesized from hydrogen and nitrogen in unit 42, which is shown only in schematic outline. Actual details of a typical unit are presented in U.S. Patent No. 2,853,371. The effluent stream 43 derived from unit 42 is now passed to ammonia condenser 44, which is provided with cooling water inlet 45 and outlet 46. The outlet gas stream 47 is cooled to a temperature preferably below 40° C., to condense a product stream of liquid ammonia. Stream 47 containing condensed liquid ammonia is passed to gas-liquid separator 48. Liquid ammonia is removed from unit 48 via stream 49, while the residual ammonia synthesis gas is recycled via 40. Stream 49 may be totally recycled via 12 for further formation of ammonium carbonate solution, however preferably a portion of stream 49 is withdrawn via 50 as a co-product of the process.

Various alternatives within the scope of the present invention will occur to those skilled in the art. Thus, it will be apparent that the process operating ranges of temperature and pressure enumerated supra represent only a preferred embodiment of the present invention, and that the process concepts and steps contemplated in the present invention are operable outside of these ranges in suitable instances.

In one aspect of the present case, a portion or all of stream 49 may be employed as liquid ammonia reflux for the upper bubble caps section of unit 14. In this case, stream 12 may be omitted, and a portion or all of stream 49 combined with stream 30 to provide total addition of ammonia at the upper end of unit 14. The bubble caps sections 28 of unit 14 may be replaced in suitable instances by functionally similar apparatus, such as a packed section or sieve trays for gas-liquid contact.

It will be appreciated that other heating or cooling steps besides those enumerated supra may be provided in practice. Thus, streams 5 and 9 will usually be cooled in waste heat boilers or by direct flashing of condensate water into the process streams, in order to provide a suitable temperature level for pool 15. Stream 41 may be cooled by refrigeration means, in order to condense out a further liquid ammonia component, which would be suitably employed as an addition to streams 30 or 12 or as a co-product of the process. Lower temperature in unit 14 may be achieved by providing cooling coils on bubble cap trays 28.

In some cases it will be desirable to produce relatively more product liquid ammonia as compared to the co-product ammonium salt. In this case, stream 9 or the intermediate compressed stream between stages of compressor 10 would be contacted with an alkaline absorbent solution as mentioned supra or water, in order to absorb and remove a portion of the carbon dioxide content from the gas stream.

Stream 18 may preferably consist of phosphoric acid. In this case, stream 26 will preferably consist of diammonium phosphate, which is a valuable fertilizer. However, another valuable fertilizer known as ureaphos may also be produced when stream 18 consists of phosphoric acid. In this case, process conditions in the lower section of unit 14 would be maintained such that a portion of the formed ammonium carbonate would be converted to urea. Such conditions would consist of a more highly elevated temperature, a lower water concentration and a high excess of free ammonia. In addition, a mixture of nitric acid and phosphoric acid may be employed as stream 18, in which case the valuable mixed fertilizer known as nitrophos is produced.

Stream 18 may also consist of an organic acid, in which case the corresponding organic ammonium salt of the acid would be produced. Stream 18 could also consist of sodium chloride as solid powdered salt or brine, in which case two valuable compounds would be produced in unit 17, namely sodium carbonate and ammonium chloride. In this case, soda ash or solid sodium bicarbonate could be produced as stream 26, in combination with an aqueous solution of ammonium chloride. The solid sodium bicarbonate would then be separately heated to yield sodium carbonate product, while the ammonium chloride solution is treated with lime to yield free ammonia as a process product, together with byproduct calcium chloride. It is evident that the scope of the present invention broadly extends to the use of any suitable compound in stream 18, such as will donate an anion to the ammonium carbonate in stream 16 and produce the corresponding ammonium salt of the anion at elevated pressure.

Although stream 9 is preferably produced by catalytic steam reforming of a fluid hydrocarbon such as natural gas or petroleum naphtha followed by the water gas shift or CO-oxidation, solid hydrocarbon fuels such as coal or coke may also be employed as raw material for the production of a crude synthesis gas, employing well-known procedures such as the water gas reaction with steam or partial oxidation.

In some instances as for example the reaction of stream 16 with a mineral acid, it will be desirable to reduce the pressure of stream 16 to a lower level prior to the addition of the mineral acid via stream 18. In this case, the concentration and solids deposition effect of unit 25 may not be obtained, and an aqueous solution of the ammonium salt would be produced, which is subsequently concentrated by evaporation to produce solid product ammonium salt.

Examples of industrial application of the process of the present invention will now be described. In the examples infra, all flow quantities will be expressed in mols/hour.

*Example I*

The process of the present invention was applied to the production of ammonia and ammonium sulfate, using calcium sulfate as the source of the sulfate anion. The crude synthesis gas stream 11 containing 100.5 carbon dioxide, 108.3 nitrogen and 325.0 hydrogen was passed into the reaction vessel 14 for formation of aqueous ammonium carbonate solution at a pressure of 4700 p.s.i.g. and a liquid pool 15 temperature of 70° C. All of the required and excess water for the reaction was passed via stream 13 into vessel 14 at a rate of 540.0 and temperature of 70° C. All of the required and excess synthetic liquid ammonia was passed into vessel 14 above reflux plates 28 via stream 30 at a rate of 250.8 and a temperature of 35° C. All of the carbon dioxide originally in stream 11 was converted to aqueous ammonium carbonate solution in vessel 14, and the resulting purified synthesis gas stream 31 withdrawn from vessel 14 at a temperature of 37° C. contained 108.3 nitrogen, 325.0 hydrogen and 22.8 ammonia.

The aqueous ammonium carbonate solution 16 withdrawn from vessel 14 at a temperature of 70° C. and pressure of 4700 p.s.i.g. was reacted with finely ground crude gypsum containing 92% by weight of calcium sulfate content. Equivalent calcium sulfate feed rate was 100.5. The resulting slurry was settled in vessel 20, and 100.5 calcium carbonate plus 19.9 silica derived from the crude gypsum was withdrawn via stream 21. The reacted liquid stream 22 was further reacted with aqueous sulfuric acid solution containing 13.5 sulfuric acid and 16.6 water to neutralize excess ammonia. A liquid ammonium sulfate solution containing 114.0 ammonium sulfate and 455.0 water was produced as a product of the process, at a temperature of 212° F. This solution was flash evaporated by pressure reduction to substantially atmospheric pressure, and a slurry of solid ammonium sulfate crystals was produced as a final product.

Example II

The process of the present invention was applied to the production of ammonia and ureaphos, using phosphoric acid as the source of the phosphate anion to yield diammonium phosphate. The crude synthesis gas stream 11 at a temperature of 40° C. and containing 100.5 carbon dioxide, 325.0 hydrogen and 108.3 nitrogen was passed into the reaction vessel 14 for formation of urea and ammonium carbamate at a pressure of 4700 p.s.i.g. and a liquid pool 15 temperature of 190° C. Synthetic liquid ammonia was passed into vessel 14 via stream 12 at a rate of 251.5 and temperature of 0° C., while reflux ammonia was introduced above reflux plates 28 via stream 30 at a rate of 83.0 and temperature of 0° C. The resulting purified synthesis gas stream 31 passed to the ammonia synthesis loop contained 324.4 hydrogen, 107.9 nitrogen and 83.0 ammonia, while stream 16 was removed as a melt containing 60.3 urea, 40.2 equivalent carbon dioxide, 130.9 equivalent free ammonia and 60.3 water at a temperature of 190° C.

Stream 16 was reacted with aqueous phosphoric acid stream 18 containing 65.5 phosphoric acid and 606.0 water at an acid inlet temperature of 20° C. The resultant reaction mixture stream 19 was expanded from 4700 p.s.i.g., to 15 p.s.i.g., which resulted in the evolution of an off-gas containing 40.0 carbon dioxide, 130.9 water vapor and minor amounts of nitrogen and hydrogen. The aqueous product solution withdrawn at 140° C. contained 60.3 urea, 65.4 diammonium phosphate and 536.3 water.

We claim:
1. In an ammonia synthesis process in which a hydrocarbon is reformed with steam and air to produce a crude reformed gas mixture principally containing hydrogen, nitrogen, carbon monoxide and steam, the carbon monoxide in the crude reformed gas mixture is catalytically reacted with steam to produce further hydrogen and carbon dioxide, thereby forming a final reformed gas mixture principally containing hydrogen, nitrogen and carbon dioxide, the final reformed gas mixture is processed to remove carbon dioxide, the resulting ammonia synthesis gas stream is passed to catalytic ammonia synthesis at elevated pressure, and the ammonia synthesis effluent gas stream is cooled to condense and separate liquid ammonia, the improvement which comprises compressing the final reformed gas mixture to elevated pressure, reacting the compressed reformed gas mixture with said liquid ammonia in the presence of water, whereby all of the carbon dioxide content of said final reformed gas mixture is converted to ammonium carbonate in aqueous solution and separated from the reformed gas mixture, passing the residual gas phase free of carbon dioxide and comprising hydrogen, nitrogen and ammonia vapor to ammonia synthesis, reacting said aqueous solution containing dissolved ammonium carbonate at elevated pressure with a compound selected from the group consisting of sulfuric acid, calcium sulfate, nitric acid and phosphoric acid, whereby a final solution containing an ammonium salt having an anion derived from said compound is formed, and reducing the pressure of said final solution, whereby water vapor is evolved from said final solution and solid ammonium salt having an anion derived from said compound is produced.

2. In an ammonia synthesis process in which a hydrocarbon is reformed with steam and air to produce a crude reformed gas mixture principally containing hydrogen, nitrogen, carbon monoxide and steam, the carbon monoxide in the crude reformed gas mixture is catalytically reacted with steam to produce further hydrogen and carbon dioxide, thereby forming a final reformed gas mixture principally containing hydrogen, nitrogen and carbon dioxide, the final reformed gas mixture is processed to remove carbon dioxide, the resulting ammonia synthesis gas stream is passed to catalytic ammonia synthesis at elevated pressure, and the ammonia synthesis effluent gas stream is cooled to condense and separate liquid ammonia, the improvement which comprises compressing the final reformed gas mixture to elevated pressure, reacting the compressed reformed gas mixture with said liquid ammonia in the presence of water, whereby a major portion of the carbon dioxide content of said final reformed gas mixture is converted to ammonium carbonate in an aqueous solution phase and separated from the residual gas phase, cooling and refluxing said residual gas phase with water and thereafter with recycle liquid ammonia at elevated pressure whereby all of the residual carbon dioxide is removed from said residual gas phase into liquid solution, combining said liquid solution with said aqueous solution phase to form a combined liquid stream, cooling said residual gas phase free of carbon dioxide, whereby liquid ammonia is condensed, recycling said condensed liquid ammonia for cooling and refluxing of said residual gaseous phase, combining the cooled residual gas phase with recycled residual ammonia synthesis effluent gas stream to form said ammonia synthesis gas stream, and reacting said combined liquid stream containing dissolved ammonium carbonate at elevated pressure with a compound selected from the group consisting of sulfuric acid, calcium sulfate, nitric acid and phosphoric acid, whereby a final solution containing an ammonium salt having an anion derived from said compound is formed.

3. The process of claim 2, in which the pressure of said final solution is reduced, whereby water vapor is evolved from said final solution and solid ammonium salt having an anion derived from said compound is produced.

4. A process for the combined production of ammonia and an ammonium salt which comprises reforming a hydrocarbon with steam and air to produce a crude reformed gas mixture principally containing hydrogen, nitrogen, carbon monoxide and steam, catalytically reacting said carbon monoxide with steam to produce further hydrogen and carbon dioxide, thereby forming a final reformed gas mixture principally containing hydrogen, nitrogen and carbon dioxide, compressing said final reformed gas mixture to elevated pressure, combining the compressed gas mixture with synthesized liquid ammonia and water, reacting the combined process stream at elevated pressure whereby all of the carbon dioxide in the combined stream is reacted with ammonia to form ammonium carbonate in aqueous solution, separating a mixed gas stream free of carbon dioxide and comprising hydrogen, nitrogen and ammonia from the aqueous ammonium carbonate solution, combining said mixed gas stream with recycled residual ammonia synthesis effluent gas stream, catalytically reacting the combined gas stream under ammonia synthesis conditions whereby an ammonia synthesis effluent gas stream is produced, cooling said ammonia synthesis effluent gas stream to condense liquid ammonia, separating and reacting said liquid ammonia as said synthesized liquid ammonia, recycling residual ammonia synthesis effluent gas stream, reacting said aqueous ammonium carbonate solution at elevated pressure with a compound containing a soluble anion, whereby a final solution containing the ammonium salt of said soluble anion is formed, and reducing the pressure of said final solution whereby water vapor is evolved from said final solution and solid ammonium salt of said soluble anion is produced.

5. The process of claim 4, in which said compound containing a soluble anion is selected from the group consisting of sulfuric acid, calcium sulfate, nitric acid and phosphoric acid.

6. A process for the combined production of ammonia and an ammonium salt which comprises reforming a hydrocarbon with steam and air to produce a crude reformed gas mixture principally containing hydrogen, nitrogen, carbon monoxide and steam, catalytically reacting said carbon monoxide with steam to produce further hydrogen and carbon dioxide, thereby forming a final reformed gas mixture principally containing hydrogen, nitrogen and carbon dioxide, compressing said final reformed gas mixture to elevated pressure, reacting the compressed gas mixture with synthesized liquid ammonia and water, whereby a major portion of the carbon dioxide content of said final reformed gas mixture is converted to ammonium carbonate in an aqueous solution phase and separated from the residual gas phase, cooling and refluxing said residual gas phase with water and thereafter with recycle liquid ammonia at elevated pressure whereby all of the residual carbon dioxide is removed from said residual gas phase into liquid solution, combining said liquid solution with said aqueous solution phase to form a combined liquid stream, cooling said residual gas phase free of carbon dioxide whereby liquid ammonia is condensed, recycling said condensed liquid ammonia for cooling and refluxing of said residual gaseous phase, combining the cooled residual gas phase with recycled residual ammonia synthesis effluent gas stream to form an ammonia synthesis gas stream, catalytically converting hydrogen and nitrogen in said ammonia synthesis gas stream to ammonia, cooling the converted gas stream to condense and separate synthesized liquid ammonia from residual ammonia synthesis effluent gas stream, recycling said residual ammonia synthesis effluent gas stream, reacting said combined liquid stream at elevated pressure and containing dissolved ammonium carbonate with a compound selected from the group consisting of sulfuric acid, calcium sulfate, nitric acid and phosphoric acid, whereby a product solution containing an ammonium salt having an anion derived from said compound is formed, and reducing the pressure of said product solution, whereby water vapor is evolved from said product solution and solid ammonium salt having an anion derived from said compound is produced.

7. A process for the combined production of ammonia and an ammonium salt which comprises reforming a hydrocarbon with steam and air at a pressure in the range of 50 p.s.i.g. to 600 p.s.i.g. to produce a crude reformed gas mixture principally containing hydrogen, nitrogen, carbon monoxide and steam, catalytically reacting said carbon monoxide with steam to produce further hydrogen and carbon dioxide, thereby forming a final reformed gas mixture principally containing hydrogen, nitrogen and carbon dioxide, compressing said final reformed gas mixture to a pressure in the range of 1000 p.s.i.g. to 5000 p.s.i.g., reacting the compressed gas mixture with synthesized liquid ammonia and water at a temperature in the range of 50° C. to 130° C., whereby a major portion of the carbon dioxide content of said final reformed gas mixture is converted to ammonium carbonate in an aqueous solution phase and separated from the residual gas phase, cooling and refluxing said residual gas phase with water and thereafter with recycle liquid ammonia to a final temperature below 50° C. whereby all of the residual carbon dioxide is removed from said residual gas phase into liquid solution, combining said liquid solution with said aqueous solution phase to form a combined liquid stream, cooling said residual gas phase free of carbon dioxide to a temperature below 40° C. whereby liquid ammonia is condensed, recycling said condensed liquid ammonia for cooling and refluxing of said residual gas phase, combining the cooled residual gas phase with recycled residual ammonia synthesis effluent gas stream to form an ammonia synthesis gas stream at a pressure in the range of 4000 p.s.i.g. to 6000 p.s.i.g., catalytically converting hydrogen and nitrogen in said ammonia synthesis gas stream to ammonia, cooling the converted gas stream to a temperature below 40° C., whereby synthesized liquid ammonia is condensed and separated from residual ammonia synthesis effluent gas stream, recycling said residual ammonia synthesis effluent gas stream, reacting said combined liquid stream at a pressure in the range of 1000 p.s.i.g. to 5000 p.s.i.g. with an acid, whereby a product solution containing the ammonium salt of said acid is formed at a temperature in the range of 70° C. to 400° C., and reducing the pressure of said product solution to the range of 5 p.s.i.g. to 100 p.s.i.g., whereby water vapor and carbon dioxide are evolved from said product solution and solid ammonium salt of said acid is produced.

8. The process of claim 7, in which said acid is sulfuric acid.

9. The process of claim 7, in which said acid is nitric acid.

10. The process of claim 7, in which said acid is phosphoric acid and said ammonium salt is diammonium phosphate.

References Cited
UNITED STATES PATENTS

| | | | |
|---|---|---|---|
| 2,086,171 | 7/1937 | Neubner | 23—61 |
| 2,656,247 | 10/1953 | Robinson | 23—119 |
| 3,193,353 | 7/1965 | Matile et al. | 23—2 X |

FOREIGN PATENTS 544,386  6/1956  Italy.

OTHER REFERENCES

Ganz: Chemical Abstracts, vol. 53, page 9588C (1955).

Ganz et al.: Chemical Abstracts, vol. 53, page 20,712g (1955).

Kiyama et al.: Chemical Abstracts, vol. 46, page 3835 b & c.

OSCAR R. VERTIZ, *Primary Examiner.*

A. J. GREIF, *Assistant Examiner.*